United States Patent

Ebbrecht et al.

[11] Patent Number: 5,977,282
[45] Date of Patent: Nov. 2, 1999

[54] ACRYLATE GROUP-MODIFIED ORGANOSILOXANYL DERIVATIVES OF ALKANEDIOL MONOVINYL ETHERS, PROCESS FOR THEIR PREPARATION, AND THEIR USE AS RADIATION-CURABLE BINDERS

[75] Inventors: Thomas Ebbrecht, Witten; Georg Feldmann-Krane, Mülheim; Stefan Silber, Krefeld; Stefan Stadtmüller, Essen, all of Germany

[73] Assignee: Th. Goldschmidt AG, Essen, Germany

[21] Appl. No.: 08/982,205

[22] Filed: Dec. 1, 1997

[30] Foreign Application Priority Data

Dec. 2, 1996 [DE] Germany .............. 196 49 844

[51] Int. Cl.⁶ .................................................. C08G 77/12
[52] U.S. Cl. ................ 528/29; 528/15; 528/26; 524/866; 525/479
[58] Field of Search .............. 528/15, 26, 29; 524/866; 525/479

[56] References Cited

FOREIGN PATENT DOCUMENTS

| 2747233 | 7/1978 | Germany . |
|---------|--------|-----------|
| 2948708 | 6/1984 | Germany . |
| 3810140 | 10/1989 | Germany . |
| 3820294 | 10/1989 | Germany . |

Primary Examiner—Randy Gulakowski
Assistant Examiner—Caixia Lu-Rutt
Attorney, Agent, or Firm—Frommer Lawrence & Haug LLP

[57] ABSTRACT

Oraganopolysiloxanes of the general formula

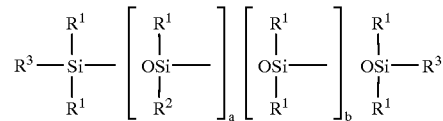

where $R^1$=identical or different aliphatic or aromatic hydrocarbon radicals, $R^2=CH_2CH_2O(CR^4R^5)_xOC(O)CR^6=CHR^7$, where $R^4$, $R^5$, $R^6$ and $R^7$ can be identical or different radicals and are each a H or alkyl radical, branched or unbranched, having up to a total of 6 C atoms and x has a value from 3 to 11, where —$(CR^4R^5)$— can also be a cyclic aliphatic or aromatic radical, $R^3=R^2$ or $R^1$, a=0 to 50 and b=0 to 500, but at least one radical $R^2$ is attached terminally and/or laterally.

18 Claims, No Drawings

ACRYLATE GROUP-MODIFIED ORGANOSILOXANYL DERIVATIVES OF ALKANEDIOL MONOVINYL ETHERS, PROCESS FOR THEIR PREPARATION, AND THEIR USE AS RADIATION-CURABLE BINDERS

The invention relates to novel organosilicon compounds which carry, terminally and/or laterally, at least one Si—C-bonded organic radical of the general formula $$\equiv Si-(CH_2)_2O(CR_2)_nOC(O)CR=CHR$$

to a process for preparing these organic-modified derivatives and to their use as curable coating materials having abhesive properties. In these compounds the organic groups containing the acrylate functions are linked to the siloxane backbone by Si—C bonds.

Polysiloxanes, which contain acrylic ester groups (acrylate groups) have become established as binders which can be cured under high-energy radiation, for example for printing inks and for preparing film-forming binders or for coating materials for plastic, paper, wood and metal surfaces. Curing is effected in particular by UV irradiation (following the addition of known photoinitiators, such as benzophenone and its derivatives) or by electron beams.

The preparation of organosiloxanes having acrylate-modified organic groups which are attached to the siloxane unit via Si—O and/or Si—C bonds, is described in numerous patent documents.

The following published and granted patent documents are cited as representative of the prior art.

Organopolysiloxanes in which the acrylate-containing organic groups are attached to the polysiloxane framework via a SiOC bond can be prepared, according to a process of DE-C-27 47 233 by reaction of —COH-containing (meth) acrylic esters with organopolysiloxanes which have SiX groups (X=alkoxy, hydroxyl or chlorine radical), by using as organopolysiloxanes those of the formula

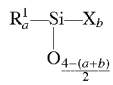

R$^1$=alkyl group having 1 to 4 C atoms and/or a phenyl group;
X=chlorine or a group OR$^2$;
R$^2$=alkyl group having 1 to 4 C atoms and/or hydrogen;
a=1.0 to 2.0;
b=0.02 to 1.6;
a+b≦2.66;

where the siloxane molecule has 3 to 100 Si atoms, and using as (meth)acrylic ester pentaerythritol tri(meth) acrylate, with the use of from 0.05 mol to equimolar amounts of the pentaerythritol ester relative to COH and SiX groups.

In a modification of this process, in accordance with DE-C-29 48 708, the procedure is to react organopolysiloxanes of the formula

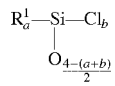

(R$^1$=alkyl having 1 to 4 carbon atoms, vinyl and/or phenyl, with the proviso that at least 90 mol-% of the groups R$^1$ are methyl; a=value from 1.8 to 2.2; b=value from 0.004 to 0.5) first of all with—based on SiCl groups—at least two-molar amounts of a dialkylamine each of whose alkyl groups has 3 to 5 C atoms, and where the C atoms adjacent to the nitrogen carry not more than one hydrogen atom each, and to allow the reaction product to react with at least equimolar amounts of pentaerythritol triacrylate or pentaerythritol trimethacrylate and then to separate the product of the process in a manner known per se from the solid constituents suspended in it.

The skilled worker is familiar with the fact that the acrylate-modified organopolysiloxanes where the organic groups which carry the acrylate radical or radicals are connected to the siloxane framework via SiC bonds are superior in terms of stability to hydrolysis to the compounds where linkage takes place via a SiOC bond.

Organopolysiloxanes, where the acrylate-containing organic groups are attached to the polysiloxane framework via SiC bonds can be prepared, for example, by subjecting a hydridosiloxane to an addition reaction with allyl glycidyl ether or another suitable epoxide with an olefinic double bond, and then esterifying the epoxide with acrylic acid to open the epoxide ring. This procedure is described in DE-C-38 20 294.

A further possibility to prepare acrylate-modified polysiloxanes with SiC linkage of the modifying group(s) is to subject a hydridosiloxane to an addition reaction with an alcohol having an olefinic double bond, for example allyl alcohol, in the presence of a platinum catalyst and then to react the OH group of this alcohol with acrylic acid or with a mixture of acrylic acid and other, saturated or unsaturated acids. This procedure is described, for example in DE-C-38 10 140.

In these reactions of hydridosiloxanes with terminal-alkenyl epoxides or terminal-alkenyl alcohols, however, an unwanted secondary reaction is rearrangement to give the nonterminal-alkenyl epoxide or nonterminal-alkenyl alcohol, respectively, which is unreactive for hydrosilylations. With these hydrosilylation reactions, therefore, it is normally necessary to employ a high excess of the alkene component, which after the end of the reaction remains in the product or must be removed again in a further working step, for example by distillation or extraction; in certain cases, such excesses may be in the range up to 50 mol-%. However, depending on the 1-alkenyl component employed, the removal of such excesses from the product is often possible only with considerable complexity if at all.

Surprisingly, in connection with the hydrosilylation reaction with alkanediol monovinyl ethers it has been found that no excess of the olefinic component is required in these reactions and that this component can be employed in amounts equimolar to the SiH component, since the rearrangement of the double bond which otherwise occurs in hydrosilylation reactions (for example in the case of allyl groups) is ruled out in the case of a vinylic double bond of this kind.

The present invention therefore provides organosiloxanyl acrylates in which the (meth)acrylate units are introduced by esterification of (meth)acrylic acid with a Si—C-bonded ethyl hydroxyalkyl ether siloxane, itself prepared by hydrosilylation of a terminal and/or lateral hydridosiloxane with an alkanediol monovinyl ether; the preparation of such compounds, and for their use as curable coating materials having abhesive properties.

Abhesive coating compositions prepared in this way are notable, furthermore, for rapid crosslinking and for a presettable, stable release behavior, which shows no substantial change even after a prolonged storage period.

The compounds according to the invention correspond to the general formula

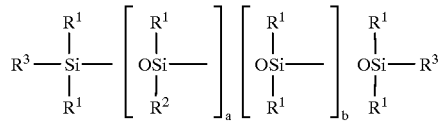

where
R$^1$=identical or different aliphatic or aromatic hydrocarbon radicals,
R$^2$=CH$_2$CH$_2$O(A)$_x$OC(O)CR$^6$=CHR$^7$, where
 A is —CR$^4$R$^5$—, a cyclic radical or an aromatic radical; wherein
  R$^4$, R$^5$, R6 and R$^7$
   can be identical or different radicals and are each a H or alkyl radical, branched or unbranched, having up to a total of 6 C atoms and x has a value from 3 to 11,
R$^3$=R$^2$ or R$^1$,
a=0 to 50 and
b=0 to 500,
but at least one radical R$^2$ is attached terminally and/or laterally.

Preference is given to compounds in which R$^1$=CH$_3$, R$^4$, R$^5$, R$^6$, R$^7$=H or CH$_3$, a=0 to 30, b=0 to 400, and particular preference to those where R$^1$=CH$_3$, R$^4$, R$^5$, R$^6$, R$^7$=H, a=0 to 20, b=0 to 250.

The skilled worker is familiar with the fact that the compounds are present in the form of a mixture having a distribution which is governed essentially by statistical laws. The values for the indices a and b are therefore average values.

The organosiloxanyl derivates according to the invention are accessible in a two-stage synthesis route. In the first stage, the respective hydroxysiloxanes are prepared by transition metal-catalyzed hydrosilylation reactions of organosiloxanyl derivatives on alkanediol monovinyl ether, and in the second step these hydroxysiloxanes are esterified with acrylic acid or acrylic acid derivatives.

They can be prepared in a simple manner by subjecting hydrogen-functional siloxanes of the general formula

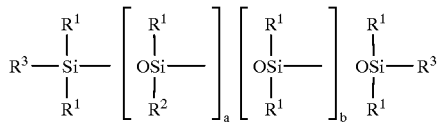

where
R$^1$=identical or different aliphatic or aromatic hydrocarbon radicals,
R$^2$=H,
R$^3$=R$^2$ or R$^1$, and the other indices are as defined above,
to an addition reaction with alkanediol monovinyl ethers of the general formula

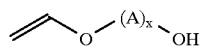

where A is CR$^4$R$^5$, a cyclic aliphatic radical, or an aromatic radical, and wherein R$^4$ and R$^5$ can be identical or different radicals and are each a H or alkyl radical, branched or unbranched, having up to a total of 6 C atoms and x has a value from 3 to 11, where —(CR$^4$R$^5$)— can also be a cyclic aliphatic or aromatic radical,
 in the presence of a hydrosilylation catalyst which is known per se (for example a platinum or rhodium catalyst) and, in a subsequent reaction stage, esterifying the adduct with acrylic acid or acrylic acid derivatives.

Preferred examples of the radicals R$^4$ and R$^5$ are hydrogen and alkyl radicals from C1 to C8. With particular preference R$^4$=R$^5$=hydrogen. x is preferably from 2 to 6. With particular preference, x=4.

Examples of substances according to the invention are:

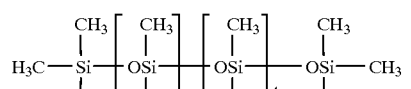

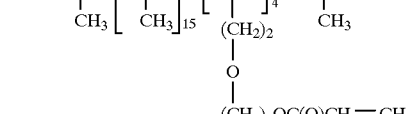

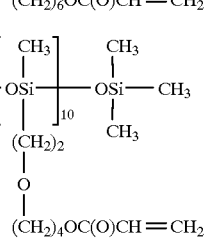

-continued

The compounds according to the invention can be employed as radiation-curing coating materials or coating compositions or as additives in such systems. They can be compounded in a customary manner with curing initiators, fillers, pigments, other acrylate systems known per se, and further customary additives. The compounds according to the invention can be crosslinked three-dimensionally by means of free radicals and cure thermally with the addition of, for example peroxides, or under the influence of high-energy radiation, such as UV or electron beams, within a very short period to form mechanically and chemically resistant coats which, given an appropriate composition of the compounds according to the invention, exhibit presettable abhesive properties. If the radiation source used is UV light, crosslinking takes place preferably in the presence of photoinitiators and/or photosensitizers, for example benzophenone and its derivatives or benzoin and corresponding substituted benzoin derivatives.

Photoinitiators and/or photosensitizers are used in the compositions comprising the organopolysiloxanes according to the invention preferably in amounts of from 0.01 to 10% by weight, in particular from 0.1 to 5% by weight, based in each case on the weight of the acrylate-functional organopolysiloxanes.

The examples which follow are intended to illustrate the invention without constituting any restriction whatsoever.

EXAMPLE 1

Addition of 1,4-butanediol monovinyl ether onto a laterally and terminally Si—H functional siloxane 40 g of 1,4-butanediol monovinyl ether are charged at 100° C. to a 500 ml four-necked flask with stirrer, dropping funnel and thermometer, under inert gas, and following the addition of 10 ppm of platinum catalyst and 0.05% by weight of n-butylethanolamine are allowed to react with a total of 322 g of Si—H-functional siloxane of the general formula $Me_2HSiO(SiMe_2O)_{83}(SiHMeO)_5SiMe_2H$.

Following the addition of 100 ppm of methylhydroquinone and 0.3% of trifluoromethanesulfonic acid in 400 ml of cyclohexane, 685 g of this terminally and laterally functionalized hydroxyalkylsiloxane are acrylicized by reaction with 47 g of acrylic acid. The reaction product is neutralized and filtered and the solvent is removed by distillation.

According to results from $^{29}$Si-NMR and $^{13}$C-NMR spectroscopy the end product has the following structure

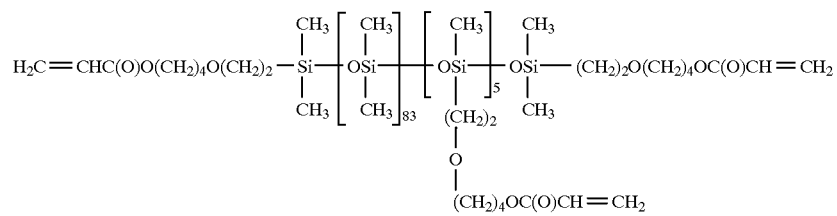

EXAMPLE 2

In a manner similar to that described in Example 1, 100 g of a terminally Si—H functionalized polydimethylsiloxane of mean chain length N=10 and of the general formula $Me_2HSiO(SiMe_2O)_8SiMe_2H$ are reacted with 32.5 g of 1,4-butanediol monovinyl ether using 10 ppm of platinum catalyst and 0.05% by weight of n-butylethanolamine. After stirring at 100° C. for 5 h the conversion is >99.5%.

To esterify the hydroxyalkylsiloxane with acrylic acid, 250 g of the terminal hydroxyalkylsiloxane are reacted, in a manner similar to that described in Example 1, with 38 g of acrylic acid in 180 ml of cyclohexane, with the addition of 100 ppm of methylhydroquinone and 0.3% of trifluoromethanesulfonic acid. The reaction product is worked up by neutralization with a 2% strength sodium carbonate solution, filtration and distillation.

According to the results of $^{29}$Si-NMR and $^{13}$C-NMR spectroscopy, the end product has the following structure

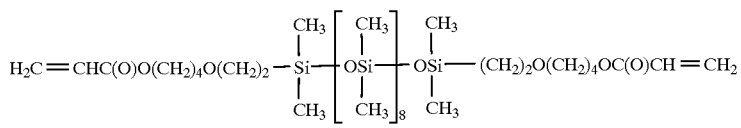

EXAMPLE 3

Addition of 1,4-butanediol monovinyl ether onto a laterally Si—H-functional siloxane 37 g of 1,4-butanediol monovinyl ether are heated to 100° C. in an inert atmosphere in a 500 ml four-necked flask equipped with intensive condenser, thermometer and dropping funnel. On reaching the temperature, 10 ppm of platinum catalyst and 0.05% by weight of n-butylethanolamine are added. Over the course of 20 minutes 224.5 g of laterally Si—H-functionalized polydimethylsiloxane of mean chain length N=58 and of the general formula $Me_3SiO(SiMe_2O)_{50}(SiHMeO)_6SiMe_3$ are added dropwise at a rate such that the reaction temperature does not exceed 110° C. The reaction mixture is stirred further until the conversion is >99.5% (about 5 h). After cooling to room temperature the product is filtered.

Acrylicization of the hydroxyalkylsiloxane

In a 1000 ml four-necked flask with stirrer, dropping funnel and thermometer, 300 g of the lateral hydroxyalkylsiloxane are heated to 65° C. under a nitrogen atmosphere together with 180 ml of cyclohexane and 100 ppm of methylhydroquinone. At this temperature, 0.3% of trifluoromethanesulfonic acid is added and then a total of 26.3 g of acrylic acid is added dropwise. The water of condensation is separated off by means of a water separator. The duration of the reaction is about 3 hours. The reaction mixture is subsequently neutralized with a 2% strength sodium carbonate solution, filtered and distilled.

According to the results of $^{29}$Si-NMR and $^{13}$C-NMR spectroscopy the end product has the following structure

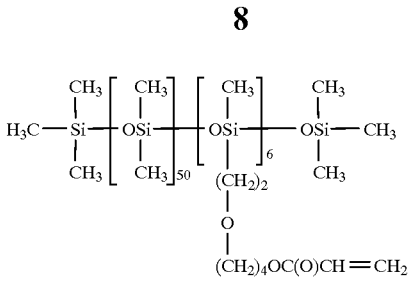

Performance Testing

To test the performance properties of the substances to be used in accordance with the invention, the products of the examples are applied to flat supports (oriented polypropylene film) and cured by the action of 2 Mrad of electron beams (EBC) or, following the addition of the photoinitiator (Darocur® 1173, Ciba Geigy), by reaction of UV light at 120 W/cm (UVC) at belt speeds of 20 m/min. The amount applied in each case is about 0.8 g/m$^2$.

Release Value

The release values are determined using different, 25 mm wide adhesive tapes from Beiersdorf, namely an adhesive tape coated with acrylate adhesive, which is obtainable commercially under the designation TESA® 7475 and adhesive tapes coated with rubber adhesive, which are obtainable commercially under the designations TESA® 4154 and TESA® 7476.

To measure the abhesiveness, these adhesive tapes are rolled onto the substrate and then stored at 40° C. under a weight of 70 g/cm$^2$. After 24 hours a measurement is made of the force required to peel the respective adhesive tape from the substrate at a rate of 30 cm/min and at a peel angle of 180°. This force is designated the release value. The general test procedure corresponds essentially to FINAT Test Method No. 10. To test the aging behavior, the storage time is extended to 7 and 14 days under the conditions described above.

Loop Test

The purpose of the loop test is to determine rapidly the degree of curing of a release coating. For this purpose a strip about 20 cm long of the adhesive tape TESA® 4154 from Beiersdorf is rolled three times onto the substrate and peeled off again immediately by hand. Then a loop is formed by placing the ends of the adhesive tape together, so that the adhesive areas of both ends are in contact over an extent of about one centimeter. The ends are then parted again by hand, during which the contact area should move uniformly to the center of the adhesive tape. In the case of contamination with poorly cured release material, the bond strength of the adhesive tape is no longer sufficient to maintain the contact area when the ends are pulled apart. In this case the test is said not to have been passed.

Residual Bond Strength

The determination of the residual bond strength is carried out very much in accordance with FINAT Test Method No. 11. For this purpose the adhesive tape TESA® 7475 from Beiersdorf is rolled onto the substrate and then stored at 40° C. under a weight of 70 g/m$^2$. After 24 hours the adhesive tape is separated from the release substrate and rolled onto a defined substrate (steel plate, glass plate, film). After one minute a measurement is made of the force required to peel the adhesive tape from the substrate at a rate of 30 cm/min and at a peel angle of 180°. The measured value is divided by the value given by an untreated adhesive tape under otherwise identical test conditions. The result is termed the residual bond strength and is generally indicated in percent.

TABLE 1

Performance testing of the substances from Examples 1 to 3

| Example | Curing | Darocur ® 1173 | Loop Test | Residual bond strength % | Release value TESA ® 7475 N/2.5 cm | Release value TESA ® 7476 N/2.5 cm | Release value TESA ® 4154 N/2.5 cm |
|---|---|---|---|---|---|---|---|
| 1 | UVC | 3% | satis. | 91 | 0.1 | 0.4 | 0.1 |
| 2 | EBC | — | satis. | 93 | 1.0 | 3.2 | 1.3 |
| 3 | UVC | 2% | satis. | 98 | 0.1 | 0.6 | 0.1 |

TABLE 2

Testing of release value stability with TESA ® 7475 after storage for 1, 7 and 14 days.

| Example | Curing | Darocur ® 1173 | Release value TESA ® 7475 1 day N/2.5 cm | Release value TESA ® 7475 7 days N/2.5 cm | Release value TESA ® 7475 14 days N/2.5 cm |
|---|---|---|---|---|---|
| 1 | UVC | 3% | 0.1 | 0.1 | 0.1 |
| 2 | EBC | — | 1.0 | 1.2 | 1.3 |
| 3 | UVC | 2% | 0.1 | 0.1 | 0.1 |

We claim:

1. An organopolysiloxane of the general formula

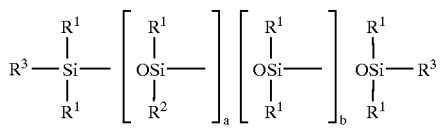

where
$R^1$=identical or different aliphatic or aromatic hydrocarbon radicals,
$R^2$=$CH_2CH_2O(A)_xOC(O)CR^6$=$CHR^7$, where
  A is —$CR^4R^5$—, a cyclic aliphatic radical, or an aromatic radical and wherein
    $R^4$, $R^5$, $R^6$ and $R^7$ are identical or different radicals and are each an H or alkyl radical, branched or unbranched, having up to a total of 6 C atoms and x has a value from 3 to 11,
$R^3$=$R^2$ or $R^1$,
a=0 to 50 and
b=0 to 500,
but at least one radical $R^2$ is attached terminally and/or laterally.

2. An organopolysiloxane as claimed in claim 1 wherein a=0 to 30.

3. An organopolysiloxane as claimed in claim 2 wherein b=0 to 400.

4. An organopolysiloxane as claimed in claim 1 wherein b=0 to 250.

5. An organopolysiloxane according to claim 1, wherein $R^1$ is a methyl radical.

6. An organopolysiloxane according to claim 1, wherein $R^4$=$R^5$=$R^6$=$R^7$=hydrogen.

7. An organopolysiloxane according to claim 1, wherein x=3 to 6.

8. An organopolysiloxane according to claim 1 wherein x=4.

9. An organopolysiloxane according to claim 1, wherein A is —$CR^4R^5$—.

10. An organopolysiloxane according to claim 1, wherein A is a cyclic radical.

11. An organopolysiloxane according to claim 1, where A is an aromatic radical.

12. A process for preparing an organopolysiloxane according to claim 1, which comprises subjecting hydrogen-functional siloxanes of the general formula

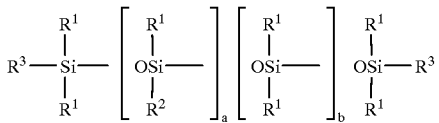

where $R^1$=identical or different aliphatic or aromatic hydrocarbon radicals,
$R^2$=H, and
$R^3$=$R^2$ or $R^1$, to an addition reaction with alkanediol monovinyl ethers of the general formula

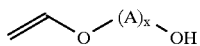

where A is $CR^4R^5$, a cyclic aliphatic radical, or an aromatic radical and wherein $R^4$ and $R^5$ can be identical or different radicals and are each an H or alkyl radical, branched or unbranched, having up to a total of 6 C atoms and x has a value from 3 to 11, in the presence of a hydrosilylation catalyst and, in a subsequent reaction stage, esterifying the adduct with acrylic acid or acrylic acid derivatives.

13. The process according to claim 12, wherein the catalyst is a platinium or rohodium catalyst.

14. In a method of preparing a curable binder, the improvement which comprises adding an organopolysiloxane according to claim 1.

15. In a method for preparing a curable, adhesive coating, the improvement which comprises adding an organopolysiloxane according to claim 1.

16. The method according to claim 15, which further comprises adding together with the organopolysiloxane at least one compound selected from the group consisting of curing inhibitors, fillers, pigments, acrylate systems, and additives.

17. A curable binder obtained by the method according to claim 14.

18. A curable, adhesive coating, obtained by the method according to claim 15.

* * * * *